United States Patent
Kondylis et al.

(10) Patent No.: US 9,350,520 B2
(45) Date of Patent: May 24, 2016

(54) FULL BANDWIDTH PROTECTION MECHANISM FOR CO-EXISTENCE OF SINGLE/MULTI-CHANNEL WIDE-BANDWIDTH WIRELESS SYSTEMS

(71) Applicant: BROADCOM CORPORATION, Irvine, CA (US)

(72) Inventors: George Dionyssios Kondylis, Palo Alto, CA (US); Chunyu Hu, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 81 days.

(21) Appl. No.: 14/144,853

(22) Filed: Dec. 31, 2013

(65) Prior Publication Data

US 2015/0146678 A1    May 28, 2015

Related U.S. Application Data

(60) Provisional application No. 61/909,954, filed on Nov. 27, 2013.

(51) Int. Cl.
| | |
|---|---|
| *H04B 7/212* | (2006.01) |
| *H04L 5/00* | (2006.01) |
| *H04W 28/26* | (2009.01) |
| *H04W 84/12* | (2009.01) |
| *H04W 74/00* | (2009.01) |

(52) U.S. Cl.
CPC ............ *H04L 5/0073* (2013.01); *H04L 5/0005* (2013.01); *H04W 28/26* (2013.01); *H04W 74/00* (2013.01); *H04W 84/12* (2013.01)

(58) Field of Classification Search
CPC .... H04L 5/0073; H04L 5/0005; H04W 84/12
USPC ................................. 370/458–462, 443–447
See application file for complete search history.

(56) References Cited

U.S. PATENT DOCUMENTS

| | | | |
|---|---|---|---|
| 7,782,822 B2 * | 8/2010 | Xhafa ............... | H04W 74/0808 370/328 |
| 8,526,349 B2 | 9/2013 | Fischer | |
| 2008/0279138 A1 * | 11/2008 | Gonikberg et al. ........... | 370/328 |
| 2011/0305288 A1 * | 12/2011 | Liu et al. ....................... | 375/260 |
| 2012/0207101 A1 * | 8/2012 | Chang et al. .................. | 370/329 |

* cited by examiner

*Primary Examiner* — Mang Yeung
(74) *Attorney, Agent, or Firm* — Garlick & Markison; Bruce E. Garlick (57) ABSTRACT

A technique to provide a protection mechanism, when operating over a plurality of channels in one's own BSS, to help avoid components in other BSSs from interfering or generating contention conflicts to those channels during its own communication. In one embodiment, a channel reservation signal, such as a Clear-To-Send-To-Self frame, is broadcast across each of a plurality of channels in order to reserve the plurality of wireless channels for a predetermined period of time. A broadcast or multicast frame may then be transmitted during the predetermined time utilizing one or more of the reserved wireless channels.

20 Claims, 7 Drawing Sheets

FULL BANDWIDTH PROTECTION MECHANISM FOR CO-EXISTENCE OF SINGLE/MULTI-CHANNEL WIDE-BANDWIDTH WIRELESS SYSTEMS

CROSS REFERENCE TO RELATED APPLICATION

The present U.S. Utility patent application claims priority pursuant to 35 U.S.C. §119(e) to U.S. Provisional Patent Application No. 61/909,954, filed Nov. 27, 2013, which is incorporated herein by reference in its entirety for all purposes.

BACKGROUND

1. Technical Field

The embodiments of the present disclosure relate to wireless communications and, more particularly, to the protection of multiple channels for full bandwidth wireless communications.

2. Description of Related Art

In the mobile communication area, one of the widely used protocols for use in communicating over a wireless local area network (WLAN) is the IEEE 802.11 protocol, including the various versions of the 802.11 protocol, such as 802.11a, 802.11b, 802.11g, 802.11n, and 802.11ac, etc. The IEEE 802.11a/b/g protocols generally transmit at a carrier frequency of 2.4 GHz or 5.0 GHz utilizing a single antenna, while 802.11n/802.11ac utilize multiple antennas implementing a technique commonly called Multiple-Input-Multiple-Output (MIMO).

The IEEE 802.11 protocol is established as a standard and utilized extensively in wireless communications. A common network implementation for a WLAN is a Basic Service Set (BSS), in which components of the BSS communicate with each other. The BSS may be a simple system, in which the BSS has a central coordinating device, such as an Access Point (AP), and one or more Stations (STA). In some instances, components of a BSS may form an ad-hoc system. A BSS may be a more complicated system as well, in which STAs may communicate with one another via peer-to-peer communication without utilizing an AP. In some instances, a device may communicate separately with its own subset of devices via a peer-to-peer link, such as a piconet.

The early IEEE 802.11 protocols specified and used a channel bandwidth of 20 MHz. However, as the numbers of wireless devices proliferate and demand for data transfers overburden the 2.4/5.0 GHz bands, new techniques are now being implemented to enhance the data transfer capability. The 802.11n protocol allows for two channels to be combined, so that an effective bandwidth of 40 MHz is used for the data transfer. A new protocol, IEEE 802.11ac further defines operations up to a bandwidth of 80 MHz and even up to 160 MHz. In cases of operating at multiple sub-channels (where each sub-channel has a bandwidth of 20 MHz), the 802.11 protocol defines a primary sub-channel. Some management frames, such as beacons, are transmitted using the primary sub-channel only. Moreover, despite the full bandwidth operation being established, using a sub-set of sub-channels to communicate is allowed, but the primary sub-channel is always included.

Although 802.11n and 802.11ac enhance the data phy (physical layer) rate by increasing the transmission bandwidth, new problems emerge when using more than 20 MHz of bandwidth (e.g. 40/80/160 MHz). For one example, despite the wider bandwidth operation that a BSS is capable of, some frames (such as beacons) are mandated to be transmitted using the primary 20 MHz bandwidth sub-channel. Also, sometimes the device may choose to use only a sub-set of 20 MHz bandwidth channels to transmit. If there is another BSS (Other BSS, noted as OBSS) operating at a 20 MHz sub-channel adjacent to one's own BSS's (MyBSS's) primary channel and within MyBSS's channel operation coverage, OBSS's communication can cause interference over MyBSS's communication.

A solution is to find a way to protect the channels needed for a wider or full bandwidth communication that uses multiple channels.

DETAILED DESCRIPTION

The embodiments described below may be practiced in a variety of communication networks that utilize wireless technology to communicate between a transmission device and a receiving device utilizing one or more communication protocols to transfer voice, video, data and/or other types of information. The particular technology described below pertains to devices in a Basic Service Set (BSS) using one of the multiple channel IEEE 802.11 protocols, such as IEEE 802.11n and/or IEEE 802.11ac (802.11n/ac). However, the embodiments are not limited to the use of 802.11 protocols and are not limited for use in a BSS infrastructure. The disclosure is applicable to other protocols that use multiple channels to obtain selected bandwidth for data transfers, which may or may not be for full bandwidth specified by a protocol, and to other network configurations, where one network is in a vicinity of another network and where contentions, collisions and/or interferences could develop between such networks.

Furthermore, the examples described herein illustrate a full bandwidth formed by a set of four 20 MHz sub-channels, which may be contiguous channels or non-contiguous channels. However, other embodiments may implement fewer or more sub-channels for full bandwidth and the sub-channel bandwidth need not be limited to 20 MHz. Additionally, the terms "channel" and "sub-channel" are used interchangeably herein.

Figure 1:
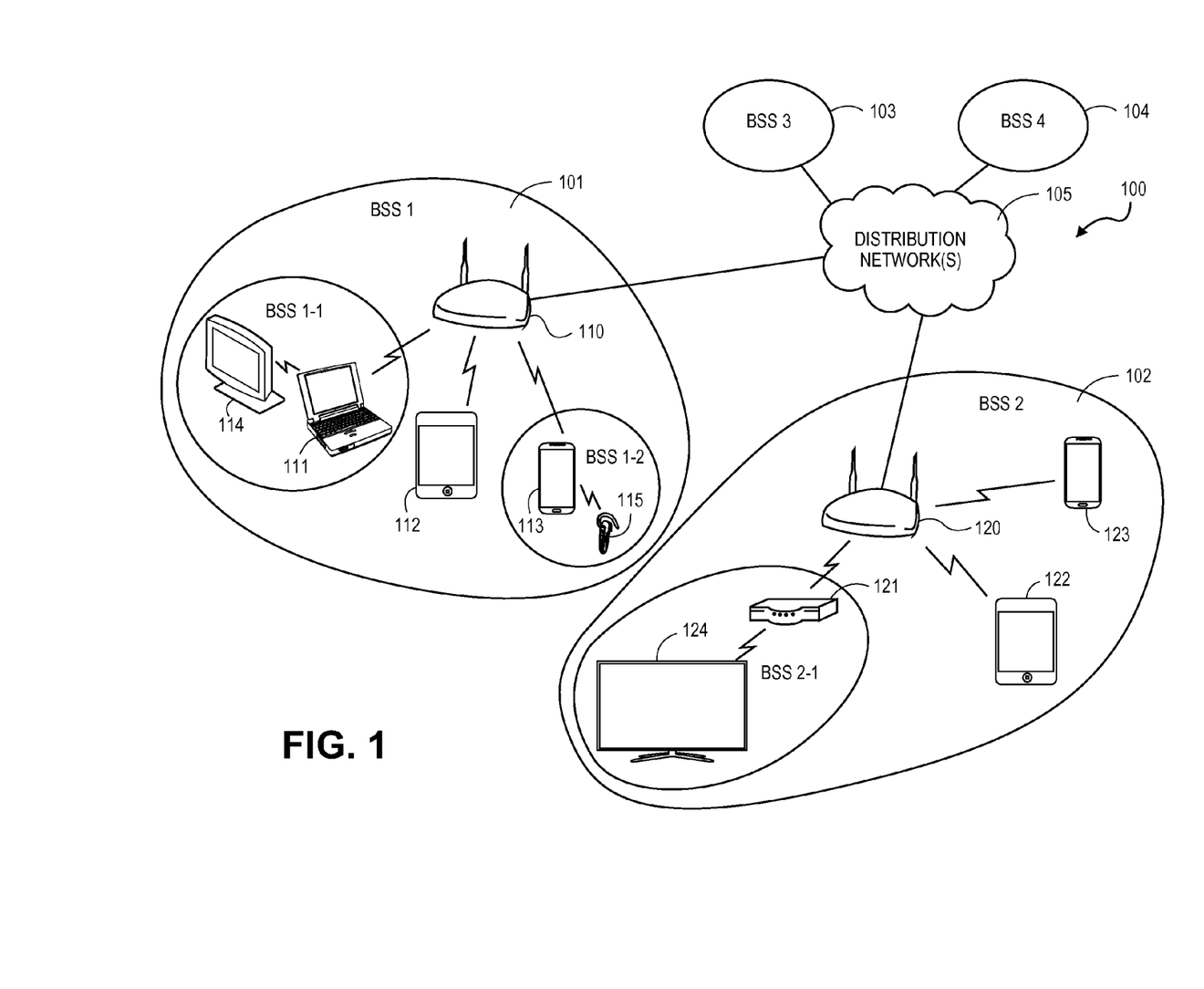
FIG. 1 shows a system diagram of an example wireless communication network connecting a number of different wireless devices in multiple Basic Service Sets (BSSs) in accordance with the present disclosure.

FIG. 1 shows a system 100 that is an example wireless communication network connecting a number of different wireless devices in multiple Basic Service Sets (BSSs). Generally, a BSS is a group of devices that are connected by wireless communication links (such as WLAN) to communicate among the devices in the group. A BSS typically has a unique identifier and operate utilizing a communication protocol, such as one of the versions of the IEEE 802.11 protocol. The BSS may have components that communicate through a control point (such as an access point), communicate ad-hoc and/or communicate peer-to-peer between devices. What is to be noted is that a given BSS configures a number of devices to operate within the BSS to communicate among the devices or between two devices (e.g. peer-to-peer). In some instances, two devices may operate as a de facto BSS.

In the particular example for system 100 of FIG. 1, a plurality of BSSs 101-104 are shown configured to operate with one or more distribution network(s) 105. BSSs 101-104 (also noted respectively as BSS1, BSS2, BSS3 and BSS4) operate independently of one another. Although BSSs 1-4 are configured via network 105, one or more BSSs may use different distribution network(s). System 100 shows a single tie-in of the BSSs via network(s) 105 for simplicity of explanation, but it is to be noted that BSSs may be configured via different networks.

For system 100, BSS1 has a plurality of devices communicating through an access point (AP) 110. In system 100, device 111 is a notebook computer or a personal computer (PC) with a wireless capability, device 112 is a tablet computing device and device 113 is a mobile phone (such as a smartphone), in which devices 111-113 communicate with AP 110.

BSS1 also includes a wireless display device 114, which communicates wirelessly with device 111 in a peer-to-peer fashion, and a wireless audio device 115, which communicates with device 113 in a peer-to-peer fashion. In one example, device 111 provides a larger viewing platform for the notebook computer and device 115 provides a wearable headphone/microphone extension to the smartphone. The two peer-to-peer connections may utilize a localized piconet, which operates separately within the BSS 1. Accordingly, the two peer-to-peer connections in BSS1 are noted as BSS1-1 and BSS1-2. In some instances, such as for WiFi Direct peer-to-peer communications, an AP may not be present.

Likewise, BSS2 includes a number of devices communicating through an AP 120. Device 121 is a set-top box, device 122 is a tablet computer and device 123 is a mobile phone (e.g. a smartphone). Set-top box 121 communicates with a television set 124 for displaying various programs as well as accessing on-line content. Although television 124 may communicate via AP 120, a peer-to-peer link is established between set-top box 121 and television 124, which is noted as BSS2-1. System 100 also shows two other BSSs 103 and 104 (BSS3 and BSS4) which have various devices and components configured within those BSSs.

The various BSSs 101-104 may operate completely independent of other BSSs, but when a particular BSS is within a communication vicinity of one or more of the other BSSs, potential problems may develop between the two or more BSSs. As an example, a collision may result from two or more BSSs attempting to acquire the same channel. The problems arise because the various BSSs 101-104 use the same 2.4 GHz or 5 GHz band for their communications. These problems are magnified when a particular BSS utilizes multiple channels to obtain higher bandwidth communication, because the problems may manifest independently in any of the used channels. As will be noted in the disclosure below, solutions are described to address protection for a BSS from contention/interference from other BSSs, when multiple BSSs are within communicating proximity of each other.

Figure 2:
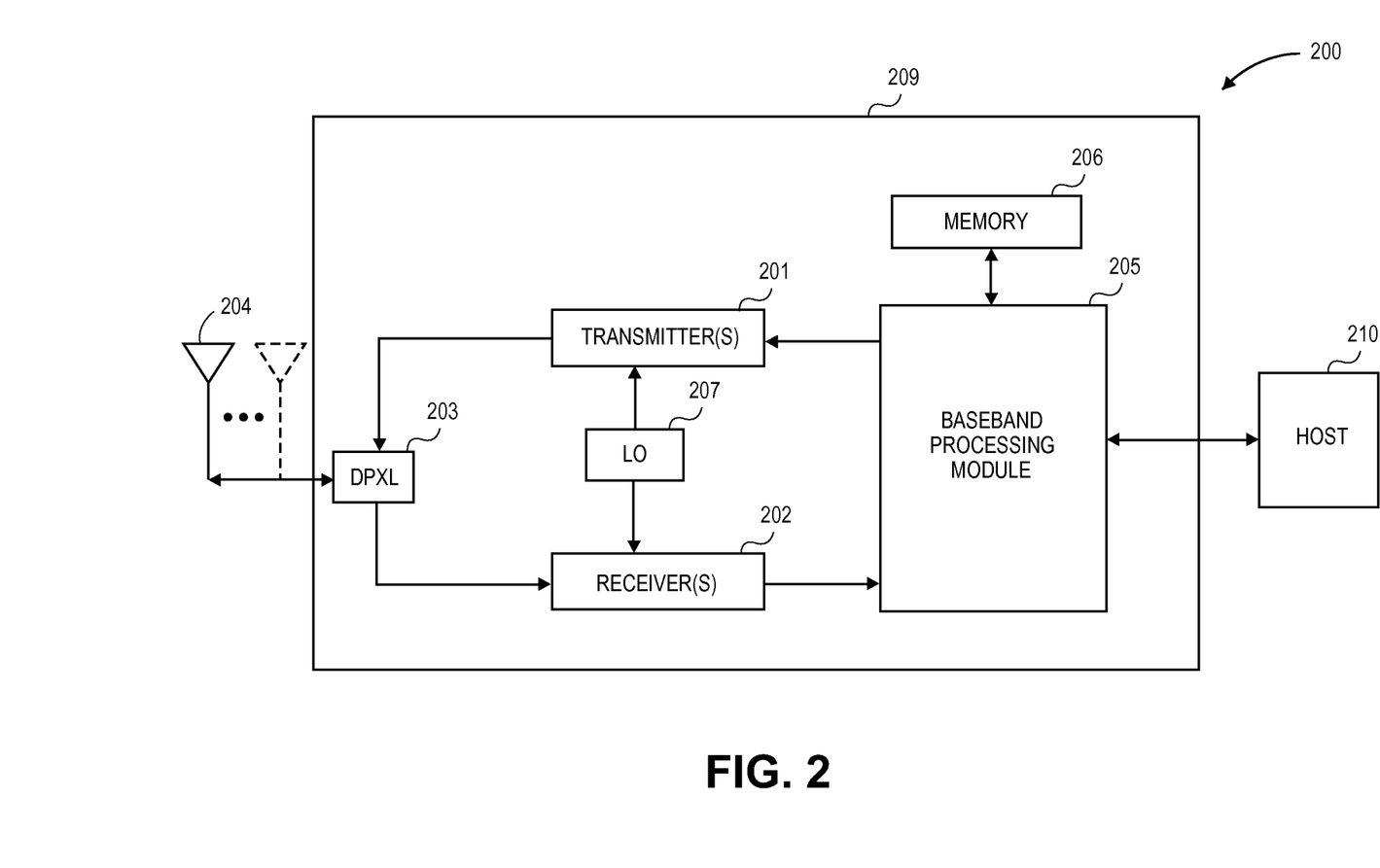
FIG. 2 shows a system block diagram of an example wireless device that utilizes a baseband processing module and a radio front-end in accordance with the present disclosure.

FIG. 2 shows a system block diagram of an example wireless device 200 that utilizes a baseband processing module and a radio front-end. Device 200 may be any of the devices shown in FIG. 1 or it may be another device utilized for wireless communications. Device 200 includes one or more transmitter(s) 201, one or more receiver(s) 202, one or more local oscillator(s) (LO) 207 and baseband processing module 205 (e.g. baseband processor, baseband processing logic or circuitry, etc.). Baseband processing module 205 provides baseband processing operations for incoming and outgoing signals. In some embodiments, baseband processing module 205 is or includes a digital-signal-processor (DSP). Baseband processing module 205 may also include a plurality of baseband processing units. Baseband processing module 205 is typically coupled to a host unit, applications processor or other unit(s) that provides operational processing for the device and/or interface with a user.

In FIG. 2, a host unit 210 is shown. Host unit 210 may be part of the device or it may be a separate unit. For example, host 210 may represent the computing portion of the computer or application portion of an application processor. A memory 206 is shown coupled to baseband processing module 205, which memory 206 may be utilized to store data, as well as program instructions that operate on baseband processing module 205. Various types of memory devices may be utilized for memory 206. It is to be noted that memory 206 may be located anywhere within the device and, in one instance, it may also be part of baseband processing module 205.

Transmitter 201 and receiver 202 provide for up-conversion and down-conversion of outgoing and incoming signals, respectively. In devices where multiple streams are utilized, such as for MIMO operation, a plurality of transmitters and receivers are present to operate on the multiple in-bound and/or out-bound streams. Where multiple transmitters and receivers are present, multiple LOs 207 may be used as well.

Transmitter(s) 201 and receiver(s) 202 couple to a duplexer (DPXL) 203, which couples to one or more antenna(s) 204. A transmit/receive (T/R) switch or other equivalent switching or multiplexing component may be used instead of DPXL 203. Likewise, a variety of antennas or antenna arrays may be used for one or more antenna(s) 204.

Outbound data for transmission from host unit 210 are coupled to baseband processing module 205 and converted to baseband signals and then coupled to transmitter 201. Transmitter 201 up-converts the baseband signals, using a local oscillator signal from LO 207, to outbound radio frequency (RF) signals for transmission from antenna(s) 204. Transmitter 201 may utilize one of a variety of up-conversion or modulation techniques (whether direct conversion or through multiple conversion steps) to up-convert the outbound baseband signals to outbound RF signal.

In a similar manner, inbound RF signals are received by antenna(s) 204 and coupled to receiver 202. Receiver 202 then down-converts the inbound RF signals to inbound baseband signals, using a local oscillator signal from LO 207, which are then coupled to baseband processing module 205. Receiver 202 may utilize one of a variety of down-conversion or demodulation techniques (whether direct conversion or through multiple conversion steps) to down-convert the inbound RF signals to inbound baseband signals. The inbound baseband signals are processed by baseband processing module 205 and inbound data is output from baseband module 205 to host unit 210.

LO 207 provides local oscillation signals for use by transmitter 201 for up-conversion and by receiver 202 for down-conversion. In some embodiments, separate LOs may be used for transmitter 201 and receiver 202. Although a variety of LO circuitry may be used, in some embodiments, a Phase-Locked Loop (PLL) is utilized to lock the LO to output a frequency stable LO signal based on a selected frequency.

In one embodiment, baseband processing module 205, LO 207, transmitter 201 and receiver 202 are integrated on a same integrated circuit (IC) chip 209. Transmitter 201 and receiver 202 are typically referred to as the RF front-end. In other embodiments, one or more of these components may be on separate IC chips. Similarly, other components shown in FIG. 2 may be incorporated on the same IC chip, along with baseband processing module 205, LO 207, transmitter 201 and receiver 202. In some embodiments, the antenna 204 may also be incorporated on the same IC chip as well. Furthermore, with the advent of system-on-chip (SOC) integration, host devices, application processors and/or user interfaces, such as host unit 210, may be integrated on the same IC chip along with baseband processing module 205 and the radio front-end.

Additionally, although one transmitter 201 and one receiver 202 are shown, it is to be noted that other embodiments may utilize multiple transmitter units and receiver units, as well as multiple LOs. For example, multiple input and/or multiple output communications, such as multiple-input-multiple-output (MIMO) communication, may utilize multiple transmitters 201 and/or receivers 202 (as well as multiple Los 207) as part of the RF front-end.

As noted above, more recent versions of the IEEE 802.11 specification (or protocol) specify that multiple channels may be used to transmit data. Because the channel bandwidth is 20 MHz per channel for the 802.11 specification, the overall bandwidth depends on the number of channels used in the communication. IEEE 802.11n specification allows for two channels, so that the full bandwidth is 40 MHz when both channels are utilized. IEEE 802.11ac specification allows for up to four channels for a full bandwidth of 80 MHz or up to eight channels for an optional implementation, which translates to a full bandwidth of 160 MHz.

Figure 3:
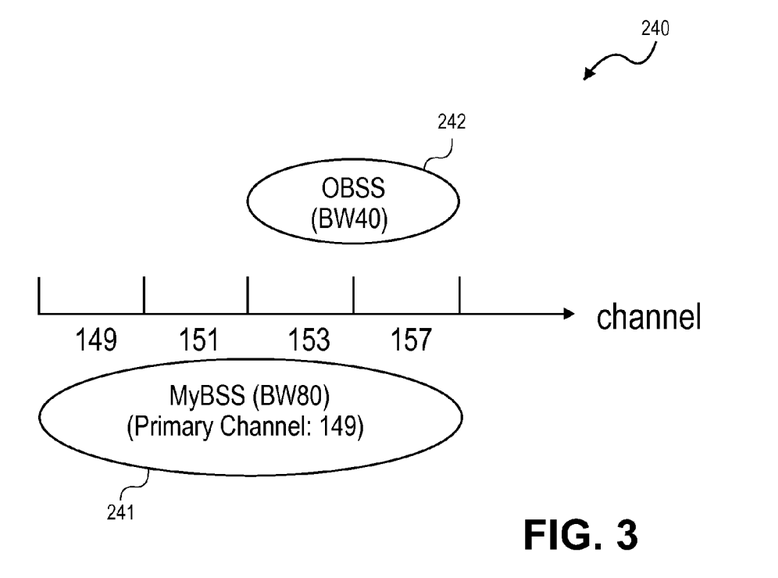
FIG. 3 shows an example channel setting of a MyBSS and an OBSS and their communications which may experience a problem that is to be addressed in accordance with the present disclosure.

FIG. 3 shows an example channel setting of a MyBSS and an OBSS and their communications which may experience a problem that is to be addressed as described below. Infrastructure 240 is shown having one's own BSS (MyBSS) 241 operating across channels 149, 151, 153 and 157 (which are 20 MHz channels each) for a total bandwidth of 80 MHz. Another BSS (labeled OBSS) 242 operates using channels 153 and 157.

Figure 4:
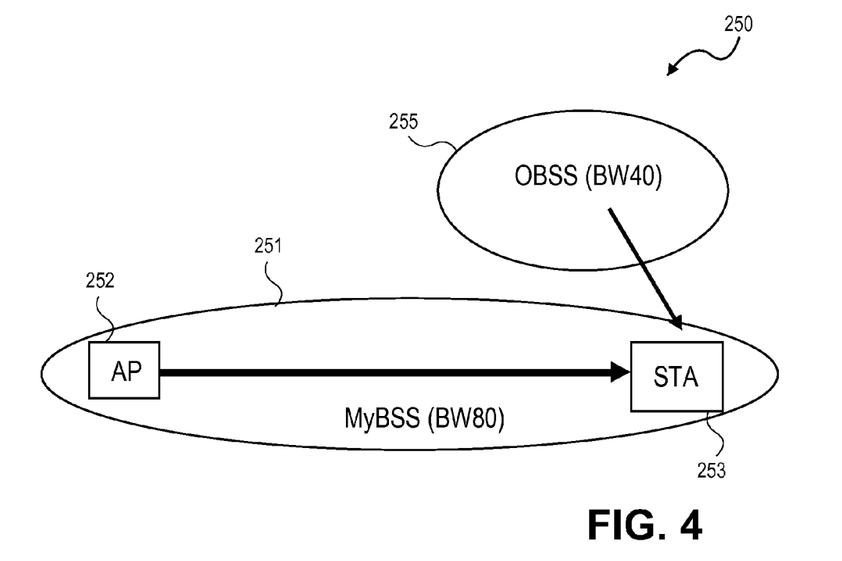
FIG. 4 continues the example illustrated in FIG. 3 and shows an example situation of an interference from an OBSS in the vicinity of MyBSS that may be addressed in accordance with the present disclosure.

FIG. 4 continues the example illustrated in FIG. 3 and shows an example situation of an interference from an OBSS in the vicinity of MyBSS. In this example, infrastructure 250 is shown having MyBSS 251 and OBSS 255, corresponding to MyBSS 241 and OBSS 242 in FIG. 3, respectively. Within MyBSS 251, the link between AP 252 and a station device (STA) 253 operates at a full bandwidth of 80 MHz using four channels. OBSS 255 operates at a full bandwidth of 40 MHz using only two 20 MHz sub-channels which are MyBSS 251's secondary channels. When there is a communication between AP 252 and STA 253 using the primary sub-channel only, without the protection mechanism described below, OBSS 255 would not be aware of it and may start its own transmission at MyBSS 251's secondary sub-channel(s). This OBSS transmission may interfere with MyBSS 251 communication since both AP 252 and STA 253 are listening on all four sub-channels. As a result, the reception at STA 253 may be degraded or even lost, especially, for example, when OBSS 256 is closer to STA 253 compared to AP 252. Utilizing the protection mechanism described below for transmission protection, BSS 251 would transmit a channel reservation signal (or frame) over all four channels and acquire use of the four channels for a specified time period, during which OBSS 255 would stay off the air in those channels.

Furthermore, the disclosure below describes how the full bandwidth channels are reserved for a BSS operating at a full bandwidth of 80 MHz. However, it is to be noted that alternatives of implementing a full bandwidth of 40 MHz (two 20 MHz channels), 160 MHz (eight 20 MHz channels), or some other bandwidth, may be extrapolated from the four channel description. In the embodiments described in FIGS. 5-10, techniques are described to transmit a channel reservation signal (or frame) across the full bandwidth of channels to reserve the channels for a full bandwidth transmission, whether the subsequent transmission occurs across the full bandwidth of operating channels or less than the full bandwidth of channels.

Figure 5:
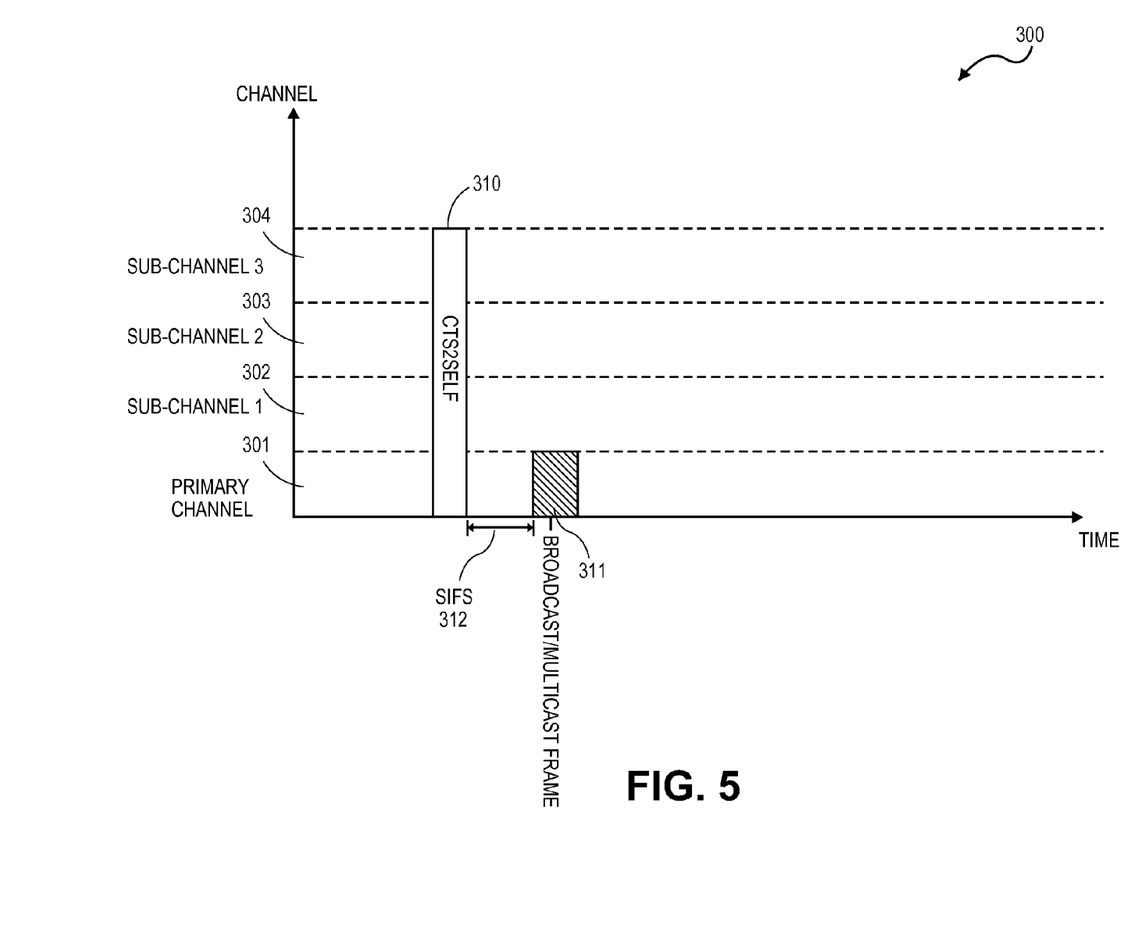
FIG. 5 shows an illustrative diagram of transmitting a Clear-To-Send-To-Self (CTS2SELF) frame as a reservation signal prior to sending a broadcast or multicast frame to reserve four channels for full bandwidth coverage in accordance with the present disclosure.
Figure 6:
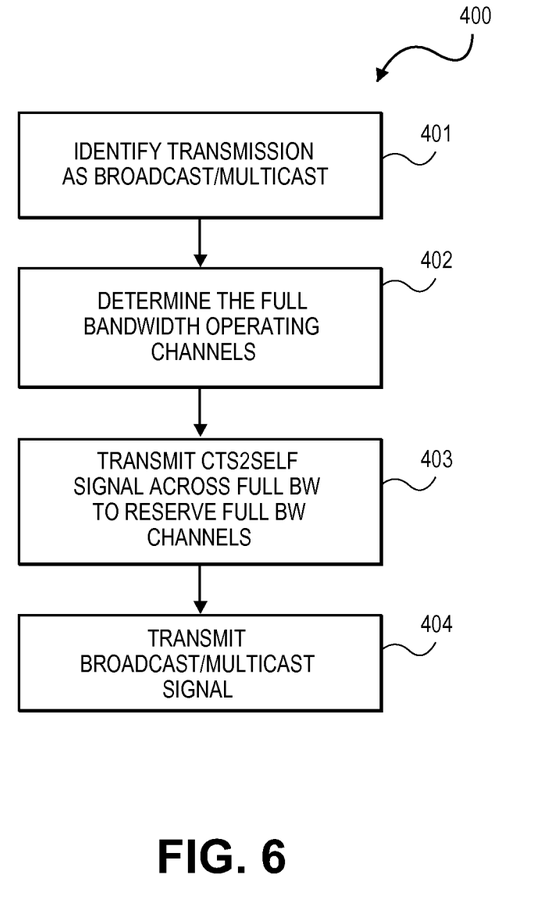
FIG. 6 shows a flow diagram of an example method for sending the CTS2SELF frame of FIG. 5 in accordance with the present disclosure.

FIG. 5 shows an illustrative diagram 300 of transmitting a Clear-To-Send-To-Self (CTS2SELF) frame 310 as a reservation signal prior to sending a broadcast or multicast frame 311 to reserve four channels for full bandwidth protection. FIG. 6 shows a flow diagram 400 of an example method for sending the CTS2SELF frame of FIG. 5. In FIG. 5, diagram 300 shows four channels that represent full bandwidth transmission for a protocol, such as 802.11ac. The four channels include a primary channel 301 and three sub-channels 302-304 noted as sub-channel 1, sub-channel 2 and sub-channel 3, respectively. Per 802.11 protocol, the various channels 301-304 are contiguous in the cases of bandwidth 40/80 MHz, and can be non-contiguous in the case of bandwidth 160 MHz. As the receiver is listening on all four sub-channels while the frame 311 is transmitted only on the primary sub-channel, to help the frame to be received more reliably, a Clear-To-Send-To-Self (CTS2SELF) frame 310 is transmitted prior to frame 311 and this CTS2SELF frame is transmitted across the full bandwidth channels. Note that CTS2SELF frame 310 is transmitted a Short Inter Frame Spacing (SIFS) 312, or some other equivalent period, ahead of frame 311. The CTS2SELF frame is shown transmitted across channels 301-304 to reserve the full bandwidth allocation of 80 MHz. The CTS2SELF frame is a Clear-To-Send (CTS) frame specifying itself as the target device to reserve the channel slot for itself for a specified time specified in the duration field in the MAC (Media Access Control) header. The CTS2SELF frame operates as a reservation signal for the full bandwidth of channels prior to the transmission of the protected signal (or frame) and reserves the channels for a time duration that covers frame 311. In one embodiment, frame 311 may be a beacon or a probe request sent over the primary channel.

In FIG. 6, the method is outlined in diagram 400. When the processing component (such as baseband processing module 205 of FIG. 2) of the transmitting device identifies that the transmission is a broadcast or a multicast frame or signal (block 401), the processing component determines the primary channel and the number of sub-channels for a full bandwidth transmission for a protocol in use (block 402). Then, the CTS2SELF frame is transmitted across the allocated channels set for the full bandwidth transmission (block 403) to reserve all the operating channels for a time period specified in the CTS2SELF frame (or a set default time period). Subsequently, the device, using the radio front-end, transmits the broadcast or multicast signal or frame following the CTS2SELF frame (block 404).

Figure 7:
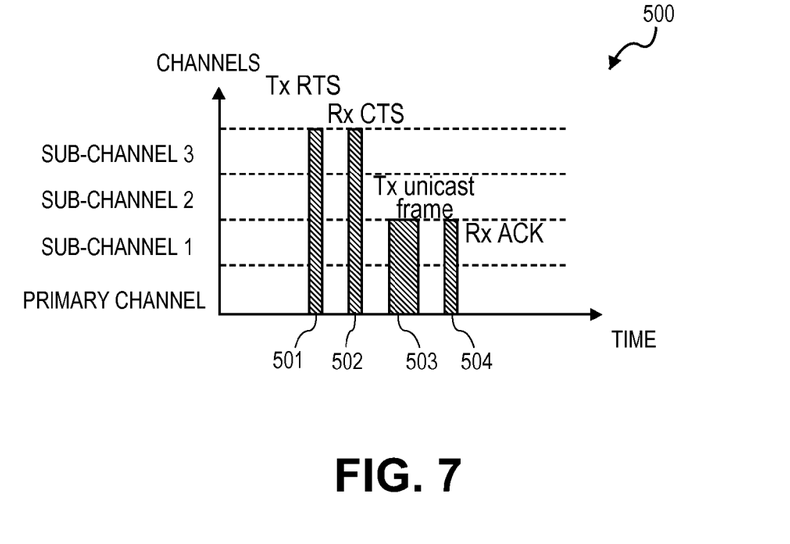
FIG. 7 shows an illustrative diagram of sending a Request-To-Send (RTS) frame as a reservation signal prior to sending a frame in a unicast transmission to a target device to reserve four channels for full bandwidth transmission in accordance with the present disclosure.
Figure 8:
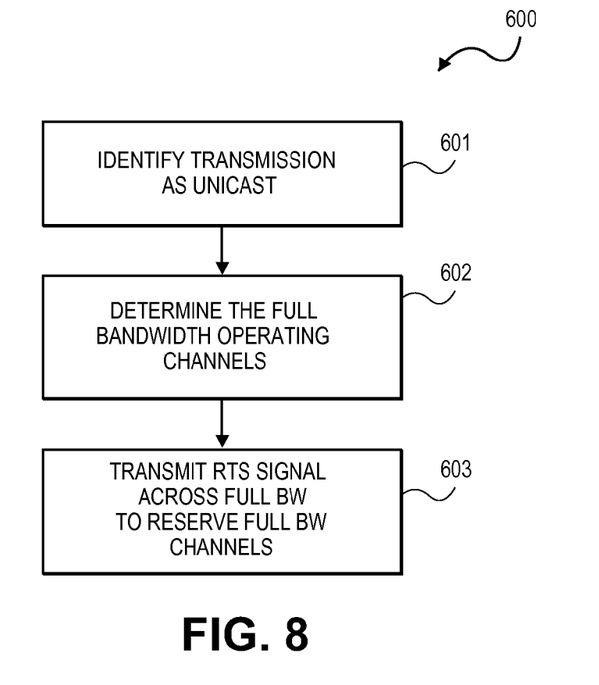
FIG. 8 shows a flow diagram of an example method for sending the RTS frame of FIG. 7 in accordance with the present disclosure.

FIG. 7 shows an illustrative diagram 500 to send a Request-To-Send (RTS) frame as a channel reservation signal prior to sending a data frame in a unicast transmission to a target device to reserve four channels for protection. FIG. 8 shows a flow diagram 600 of an example method for sending the RTS frame of FIG. 7. Referring to FIG. 7, diagram 500 shows the four channels (primary plus three sub-channels) that represent a full bandwidth transmission of 80 MHz. In this instance, the device that employs the disclosed protection mechanism is the transmitter of the unicast frame, noted as the originating device. In a normal 802.11 unicast data frame transmission, an optional RTS/CTS handshake can be used to protect the transmission and the RTS is transmitted using the same channel(s) as the following data frame and it specifies a time period to reserve the channel(s). It is expected that a target receiving (RX) device will respond with a CTS frame 502 within a SIFS, or some other equivalent spacing, to establish the handshake. Generally, the CTS frame 502 specifies a time period as well to reserve the channel(s) for the two devices to communicate. In a typical operation, the CTS frame responds in the same channel(s) occupied by the RTS frame.

As shown in FIG. 7, the unicast frame is intended to be transmitted using only a sub-set of the full operating channel: one primary sub-channel and one secondary sub-channel. The reception of such a frame, for the similar reason explained prior, is subject to interference from any OBSS devices that operating only on its other secondary sub-channels. Accordingly, to protect its own transmission, the originating device mandates to initiate a RTS/CTS handshake and transmit the RTS frame across the full bandwidth channels (primary channel plus the three sub-channels in FIG. 7) to reserve all four channels for a time period specified in the RTS frame. When the receiving target device responds with the CTS frame, the target device transmits the CTS frame with its reservation time period specified in the CTS frame. The CTS frame is expected to be transmitted across all four channels. The originating device then transmits data frame 503, which is protected by the reservation mechanism, and the target device responds with an acknowledgement (ACK) or Block-ACK frame 504 after receiving the data. The data frame may be sent using one, some or all channels, but the RTS/CTS frames, across the channels allocated for full bandwidth operation, ensures that full bandwidth operating channels are reserved for the subsequent data transmission.

In FIG. 8, the method is outlined in diagram 600. When the processing component (such as baseband processing module 205 of FIG. 2) of the transmitting device identifies the transmission is unicast (block 601) which may use a sub-set of channels of the full bandwidth operating channels, the processing component determines the primary channel and the number of sub-channels for a full bandwidth transmission for a protocol in use (block 602). The transmitting device then transmits a RTS frame across all the operating channels (block 603) to reserve the full bandwidth channels for a time period specified in the RTS frame (or a set default time period). Subsequently, the target device responds with a CTS frame across the four channels. Thus, invoking a RTS/CTS handshake across all the operating channels reserves the full bandwidth for the subsequent communication between the originating device and the target device.

Figure 9:
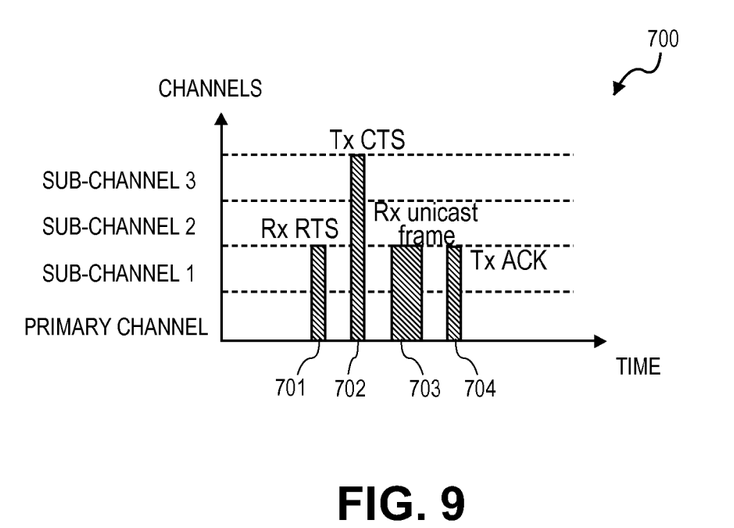
FIG. 9 shows an illustrative diagram of sending a Clear-To-Send (CTS) frame as a reservation signal after receiving a RTS frame of a unicast transmission to reserve four channels for full bandwidth transmission in accordance with the present disclosure.
Figure 10:
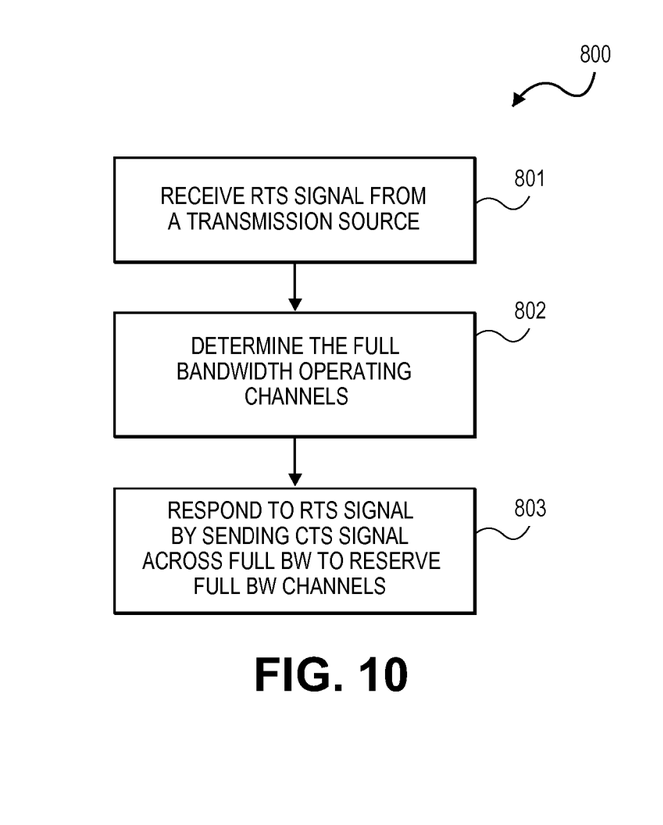
FIG. 10 shows a flow diagram of an example method for sending the CTS frame of FIG. 9 in accordance with the present disclosure.

FIG. 9 shows an illustrative diagram 700 to send a Clear-To-Send (CTS) frame as a response to the received RTS frame of a unicast transmission to extend the reservation of medium access to cover the full bandwidth of operating channels. In this instance, the device that receives the unicast data frame is the device of interest that deploys the disclosed protection mechanism. FIG. 10 shows a flow diagram 800 of an example method for sending the CTS frame of FIG. 9. An originating device transmits a RTS frame 701, which is received by the receiving (RX) device. This RTS frame may occupy the primary channel only, the primary channel plus some sub-channels, or the primary channel and all of the sub-channels, depending on the following unicast frame's transmission bandwidth. The target device then responds by transmitting (TX) a CTS frame 702 over the full bandwidth channels, no matter how many channels were occupied by the originating RTS frame. The CTS frame reserves the full bandwidth channels so that the unicast frame 703 subsequently transmitted by the originating device has full bandwidth protection, irrespective of the coverage provided by the originating RTS frame. The data may be sent using one, some or all channels, but the CTS frame across the channels allocated for full bandwidth operation ensures that full bandwidth capability is reserved for protection of the subsequent data transmission. After receiving the data, an ACK or BlockACK frame 704 is sent by the receiving device.

In FIG. 10, the method is outlined in diagram 800. When the processing component (such as baseband processing module 205 of FIG. 2) of the receiving device receives the RTS frame (block 801), the processing component determines the primary channel and the number of sub-channels for a full bandwidth transmission for a protocol in use (block 802). Then, in response to the RTS frame, the CTS frame is transmitted back to the RTS originating device across the allocated channels set for the full bandwidth transmission (block 803) to reserve the full bandwidth channels for a time period specified in the CTS frame (or a set default time period). The transmitting of the CTS frame across the channels of full bandwidth transmission reserves the full bandwidth channels for the originating device and the target device to communicate using any or all of the full bandwidth channels. The full bandwidth CTS response is sent across the full bandwidth channels, irrespective of the number of channels occupied by the originating RTS frame.

When a channel reservation signal or frame, in the format of CTS2SELF, RTS, CTS, or any others, seeks to reserve the operating channels of a full bandwidth transmission for a predetermined period of time, the reservation mechanism notifies other devices within communicating range to stay off the air in those channels for the period specified. This protection mechanism sits at the MAC layer and, hence, can be understood and complied by any device that communicates using the 802.11 protocol. While a particular BSS can deploy a protection mechanism applicable to that BSS only, devices from OBSSs may not necessarily understand it. However, the reservation protection mechanism described above can overcome such a limitation.

Thus, a full bandwidth protection mechanism for a BSS is described. The disclosure pertains to a particular protocol and bandwidths, but is not limited to such protocols and bandwidths. With the embodiments described herein, the protection mechanism is applicable to IEEE 802.11 protocols and, more particularly, to 40 MHz, 80 MHz and 160 MHz full bandwidth operations as introduced in IEEE 802.11n/ac. However, other embodiments may be readily implemented to transmit the data, including embodiments that use other bandwidths than those noted herein. Furthermore, the description referenced the protection of MyBSS from OBSSs. However, other network configurations may implement the protection scheme and the protection mechanism is not limited strictly to BSSs. Furthermore, BSS protection is applicable to de facto BSSs, which are formed by devices that communicate ad-hoc or peer-to-peer, including WiFi Direct devices that establish a link in a peer-to-peer fashion.

As may be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level.

As may also be used herein, the terms "processing module", "processing circuit", "processor", "processing unit", "baseband processor", "signal processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The term "module" is used in the description of one or more of the embodiments. Such terms may be applicable to a circuit, part of a circuit or grouping of circuits that provide a particular function.

The one or more embodiments are used herein to illustrate one or more aspects, one or more features, one or more concepts, and/or one or more examples that may be implemented. While particular combinations of various functions and features of the one or more embodiments have been expressly described herein, other combinations of these features and functions are likewise possible. The disclosure is not limited by the particular examples disclosed herein and expressly incorporates other combinations as well.

What is claimed is:

1. A method comprising:
   identifying, by use of a wireless communication device operating within a first Basic Service Set (BSS), a plurality of channels to be utilized for an operating bandwidth as specified by a communication protocol, in which the plurality of channels include a primary channel and at least one sub-channel;
   broadcasting a channel reservation signal, in accordance with the communication protocol, across each of the plurality of channels to reserve each of the plurality of channels for a predetermined period of time; and
   transmitting, from the wireless communication device and in accordance with the communication protocol, a broadcast or multicast frame following the channel reservation signal, in which the broadcast or multicast frame utilizes one or more of the plurality of channels, but in which the plurality of channels of the operating bandwidth are reserved for the transmitting of the broadcast or multicast frame as a result of the broadcasting of the channel reservation signal by the wireless communication device to recipient communication devices within wireless communication range of the wireless communication device, including recipient communication devices operating in a second BSS.

2. The method of claim 1, wherein the channel reservation signal is a Clear-To-Send-To-Self (CTS2SELF) frame broadcast from the wireless communication device, in which the CTS2SELF frame is transmitted across each of the plurality of channels.

3. The method of claim 1, wherein the channel reservation signal is a Clear-To-Send-To-Self (CTS2SELF) frame broadcast from the wireless communication device prior to a broadcast or multicast transmission of the broadcast or multicast frame, in which the CTS2SELF frame is transmitted across each of the plurality of channels.

4. The method of claim 3, wherein the broadcast or multicast frame following the CTS2SELF frame includes a beacon or a probe request broadcast over the primary channel.

5. The method of claim 1, wherein the communication protocol is a version of an 802.11 protocol that utilizes multiple channels for transmission.

6. The method of claim 1, wherein the communication protocol is an 802.11n or an 802.11ac protocol.

7. The method of claim 1, wherein the plurality of channels respectively have a channel bandwidth of 20 MHz and a full bandwidth of 40 MHz, as the operating bandwidth, is obtained by utilizing one primary channel and one sub-channel.

8. The method of claim 1, wherein the plurality of channels respectively have a channel bandwidth of 20 MHz and a full bandwidth of 80 MHz, as the operating bandwidth, is obtained by utilizing one primary channel and three sub-channels.

9. The method of claim 1, wherein the plurality of channels respectively have a channel bandwidth of 20 MHz and a full bandwidth of 160 MHz, as the operating bandwidth, is obtained by utilizing one primary channel and seven sub-channels.

10. An apparatus comprising:
    a baseband processor to identify a plurality of channels to be utilized for an operating bandwidth as specified by a communication protocol, in which the plurality of channels include a primary channel and at least one sub-channel, and the baseband processor is configured to generate a channel reservation signal; and
    a radio front-end configured with the baseband processor to broadcast the channel reservation signal, in accordance with the communication protocol, across each of the plurality of channels to reserve each of the plurality of channels for a predetermined period of time and the radio front-end to transmit a broadcast or multicast flame following the channel reservation signal, in which the broadcast or multicast flame utilizes one or more of the plurality of channels, but in which the plurality of channels are reserved by the channel reservation signal for the transmission of the broadcast or multicast flame as a result of the broadcast of the channel reservation signal by the apparatus to recipient communication devices within wireless communication range of the apparatus, including recipient communication devices of another Basic Service Set (BSS) operating external to a BSS that includes the apparatus.

11. The apparatus of claim 10, wherein the channel reservation signal is a Clear-To-Send-To-Self (CTS2SELF) frame transmitted prior to a broadcast or multicast transmission of the broadcast or multicast frame following the channel reservation signal, in which the CTS2SELF frame is transmitted across the plurality of channels.

12. The apparatus of claim 10, wherein the plurality of channels respectively have a channel bandwidth of 20 MHz and a full bandwidth of 40 MHz, as the operating bandwidth, is obtained by utilizing one primary channel and three sub-channels.

13. The apparatus of claim 10, wherein the plurality of channels respectively have a channel bandwidth of 20 MHz and a full bandwidth of 80 MHz, as the operating bandwidth, is obtained by utilizing one primary channel and three sub-channels.

14. The apparatus of claim 10, wherein the plurality of channels respectively have a channel bandwidth of 20 MHz and a full bandwidth of 160 MHz, as the operating bandwidth, is obtained by utilizing one primary channel and seven sub-channels.

15. The apparatus of claim 10, wherein the communication protocol is an 802.11n or an 802.11ac protocol.

16. The apparatus of claim 10, wherein the broadcast or multicast frame following the CTS2SELF frame includes a beacon or a probe request broadcast over the primary channel.

17. A method comprising:
receiving, by a first device in a wireless network, a Clear-To-Send-To-Self (CTS2SELF) frame broadcast from a second device in the wireless network over a plurality of channels to be utilized for a full bandwidth transmission as specified by a communication protocol, in which the plurality of channels include a primary channel and at least one sub-channel, the CTS2SELF frame operating in accordance with the communication protocol to reserve the plurality of channels for a predetermined period of time;
delaying, in the first device, transmissions according to the communication protocol over the plurality of channels for the predetermined period of time; and
receiving broadcast or multicast data from the second device at the first device following the CTS2SELF frame, in which the broadcast or multicast data is provided over one or more of the plurality of channels in accordance with the communication protocol, but in which the plurality of channels are reserved for the transmission of the broadcast or multicast data following the CTS2SELF frame.

18. The method of claim 17, wherein the plurality of channels respectively have a channel bandwidth of 20 MHz and the full bandwidth of 40 MHz, 80 MHz or 160 MHz is obtained by utilizing one primary channel and one or more sub-channels.

19. The method of claim 17, wherein the communication protocol is a version of an 802.11 protocol that utilizes multiple channels for data transmission.

20. The method of claim 17, wherein the broadcast or multicast data following the CTS2SELF frame includes a beacon or a probe request broadcast over the primary channel.

* * * * *